(12) United States Patent
Grobman

(10) Patent No.: US 7,215,778 B2
(45) Date of Patent: May 8, 2007

(54) ENCRYPTED CONTENT RECOVERY

(75) Inventor: Steven L. Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 10/404,689

(22) Filed: Mar. 31, 2003

(65) Prior Publication Data

US 2004/0190722 A1    Sep. 30, 2004

(51) Int. Cl.
*H04L 9/00* (2006.01)
(52) U.S. Cl. .................. 380/277; 380/281; 380/282
(58) Field of Classification Search ........ 380/277–279, 380/281, 282, 284, 285–286; 713/189
See application file for complete search history.

(56) References Cited

U.S. PATENT DOCUMENTS 5,144,665 A * 9/1992 Takaragi et al. ............ 380/30
5,200,999 A * 4/1993 Matyas et al. ............ 380/277
5,559,889 A * 9/1996 Easter et al. ................ 380/30

* cited by examiner

*Primary Examiner*—Hosuk Song
(74) *Attorney, Agent, or Firm*—Fish & Richardson P.C.

(57) ABSTRACT

Systems and techniques to enable secure and efficient recovery of encrypted content may include accessing a public key of a user and another user and encrypting data using the public keys. The another user may be the user's manager. Systems and techniques may include generating a session key, encrypting data using the session key, and encrypting the session key using the public keys of at least two users. A data structure such as a directory may be accessed to obtain information such as one or more public keys.

29 Claims, 5 Drawing Sheets

ENCRYPTED CONTENT RECOVERY

BACKGROUND

Information protection poses a complex problem for individuals and businesses. Businesses in particular may find it difficult to protect information from unauthorized access and at the same time allow easy access by authorized users.

For example, it may be difficult to ensure that encrypted information may be recovered in the event that the key to decrypt the information is unavailable. If the key or keys necessary to access the information are lost (e.g., if a hardware cryptographic device is misplaced or if a key stored in a memory or magnetic medium is lost when the memory is inaccessible for some reason), the data may become either temporarily or permanently inaccessible.

Key escrow systems may be used to enable content recovery of encrypted information. Key escrow systems store a key to access encrypted information in a safe location so that the encrypted information may be later recovered. For example, an employee may have a key for decryption of data. The same key may also be stored in a central repository and may be accessed when needed by an appropriate person.

Alternately, "master key" encryption systems may also be used to enable data recovery. A master key system may encrypt data using both a user's public key and a master public key. In a corporation, each employee may have a personal public key, and may access the company public key for encrypting electronic documents. Either of the user's private key or the company private key may be used to decrypt the data, so that if the user's key is unavailable for some reason, the data may still be accessed.

DESCRIPTION OF DRAWINGS

Like reference symbols in the various drawings indicate like elements.

DETAILED DESCRIPTION

Existing encryption content recovery techniques may have certain limitations, particularly when used in a corporate environment.

For example, key escrow requires that a copy of the private key be stored in escrow. Therefore, systems that do not allow the private key to be copied (e.g., systems where a private key is stored on a removable cryptographic device such as a SmartCard) may not be used. Additionally, implementing a key escrow system may be costly, since people and processes may be required to administer the system. Further, since the people administering the system generally have access to the stored keys, key escrow systems may also pose a security risk.

Master key systems also pose a number of problems. An important problem is that since a single master key can decrypt all documents, a person who gains access to the master key may be able to access all encrypted documents.

Figure 1A:
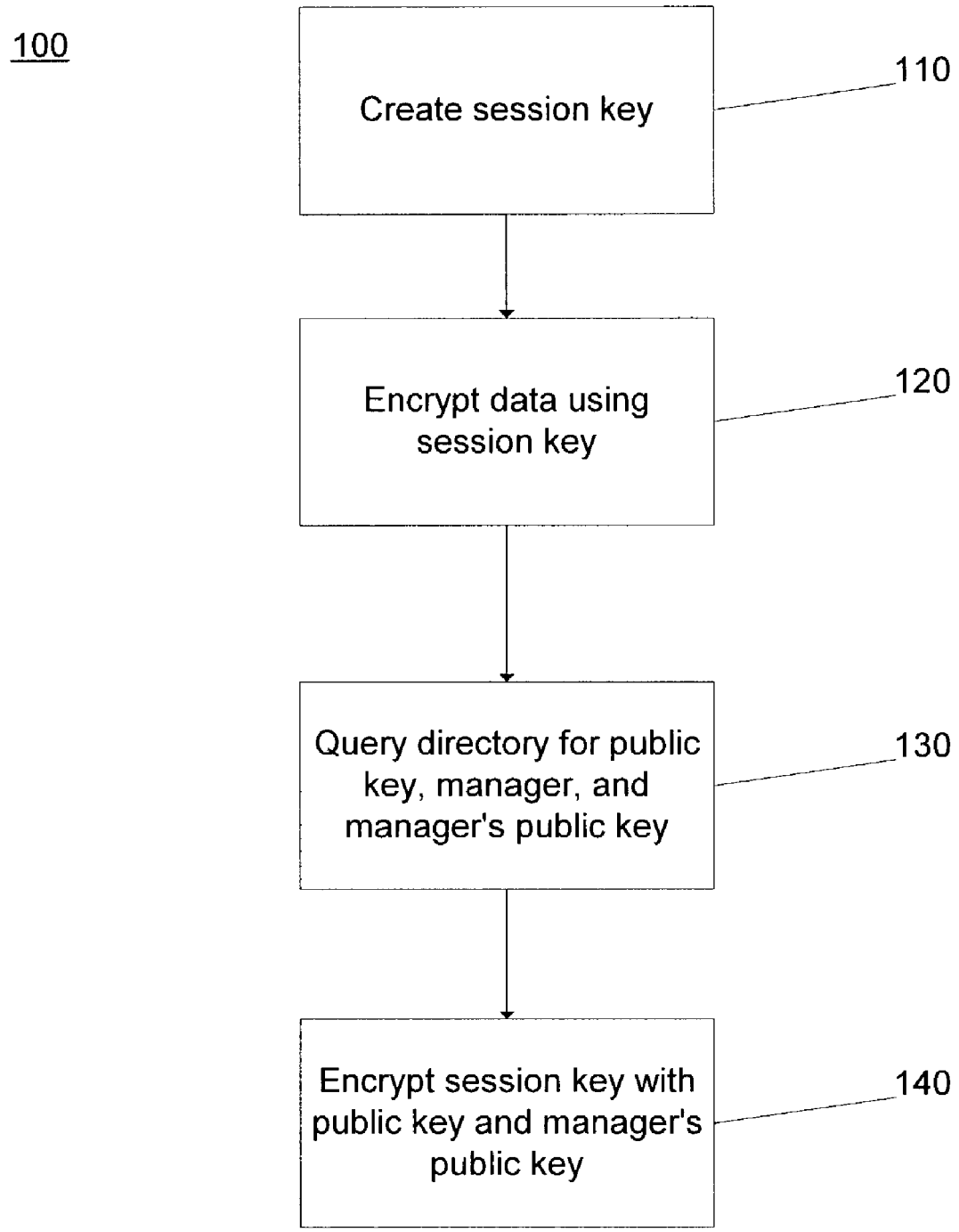
FIG. 1A shows an encryption process to enable content recovery.

FIG. 1A illustrates a process 100 for encrypting data that allows for efficient and secure data recovery, according to an implementation. The encryption process may include creating a session key at 110. The data may then be encrypted using the session key at 120. A directory may be queried to obtain a user's public key, the name or other identifier of his manager, and his manager's public key at 130. The query need only return the public keys; that is, the name of the person's manager need not be returned (although in some circumstances it may be helpful to have the query also return the manager's name). The session key may be encrypted with the user's public key and his manager's public key at 140.

More generally, data may be encrypted with a user's public key and with the public key of another user. The public keys may be obtained from one or more data objects in a data structure (e.g., from one or more directory entries in a directory). For example, a user's public key may be obtained by accessing a directory entry associated with the user. The name of other identifier of the user's manager (or other person associated with the user) may be obtained from the directory entry associated with the user. The public key of the user's manager may then be obtained from the directory entry of the user or the directory entry of his manager.

Directories such as Microsoft's Active Directory, Novell's eDirectory, or directories using the lightweight directory access protocol (LDAP), such as OpenLDAP, may be used. In some implementations, a directory may be integrated with another application such as an email application or an encrypting file system application.

Decrypting the data thus requires recovering the session key and subsequently using the session key to decrypt the data. Since there are two separate copies of the encrypted session key, either of the user's private key or his manager's private key may be used to decrypt the session key.

Figure 1B:
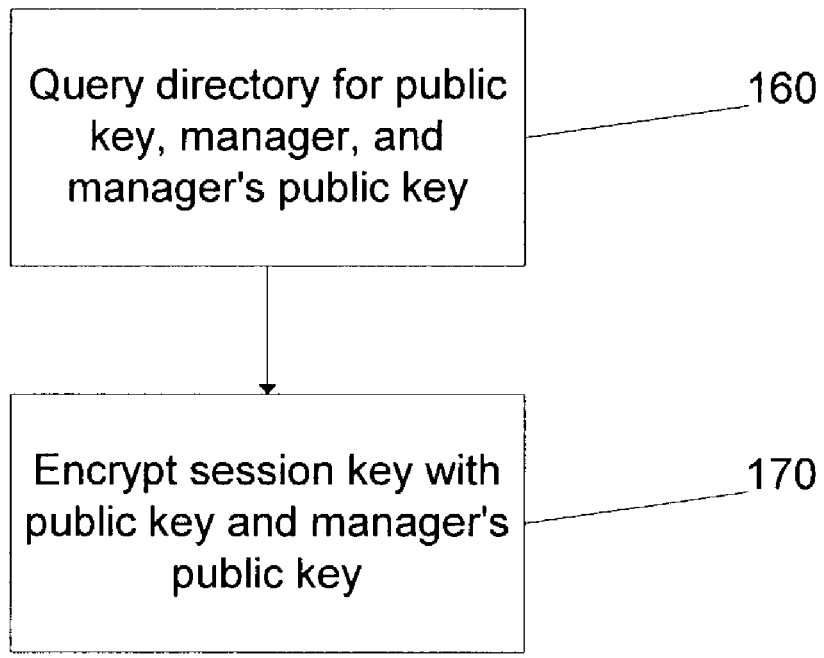
FIG. 1B shows another encryption process to enable content recovery.

FIG. 1B shows an implementation that does not use a session key. A process 150 includes querying a directory for a user's public key, manager name, and manager's public key at 160. The data is then encrypted using both the user's public key and the manager's public key at 170. Although this process includes fewer steps, it may be inefficient in cases where a large amount of data is encrypted. Rather than encrypting the file once using the session key and encrypting only the session key twice, the large file is encrypted twice, producing two large encrypted files.

Figure 2:
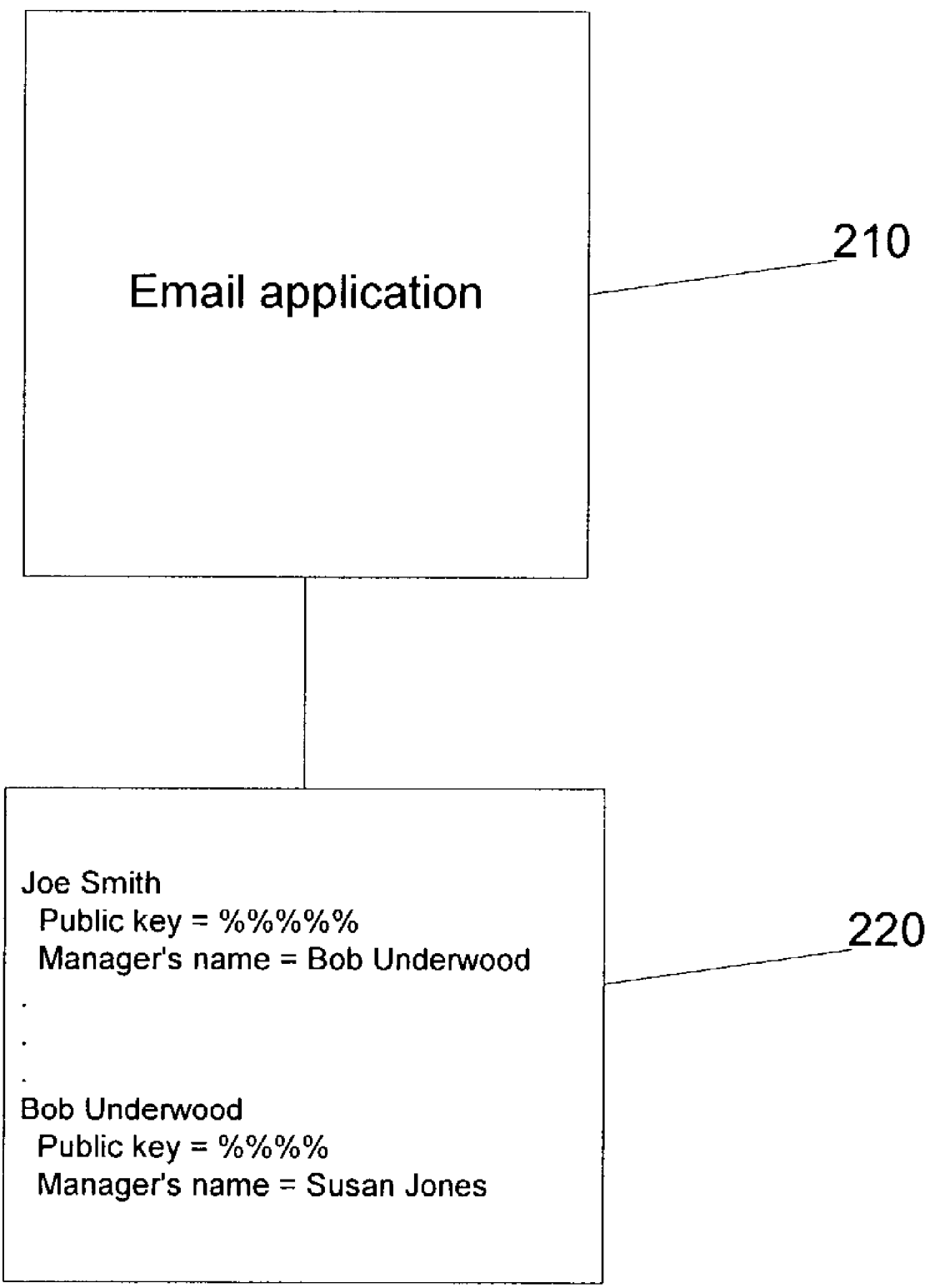
FIG. 2 shows how content recovery may be enabled in an encrypting email application.

FIG. 2 shows an implementation for encrypting data using an email application 210. Encrypting email systems generally access one or more directories such as directory 220 storing a user's public key. Directory 220 may be included in email application 210 or may be separate. The directory entry for a particular user may also include information such as the name of the user's manager (e.g., the person to whom the user reports in the company's human resources hierarchy). When an encrypted email is to be sent to the user, directory 220 is queried for his public key, which is then used in the encryption (e.g., to encrypt the data or to encrypt a session key). Directory 220 is also queried for his manager's name (or other identifier, such as a pointer to a directory entry associated with the manager) and public key. The manager's public key is also used to encrypt the data or session key.

For example, when a user wants to send an encrypted email to Joe Smith, email application 210 queries directory 220 to determine Joe Smith's public key, his manager's name (or other identifier), and his manager's public key. The data to be encrypted (e.g., email text and/or one or more email attachments) is then encrypted using a technique such as those shown in FIGS. 1A and 1B.

If the email is to be sent to a number of recipients, the process may be used for each recipient or fewer than all recipients. That is, the data or session key may be encrypted with the public key of each email recipient and the public key of each of their managers, or may be encrypted with the public key of each email recipient but the public key of fewer than all of their managers.

Note that the email itself is sent to the recipients but is generally not sent to the manager(s). Although the system may be designed so that the manager receives emails as well as the intended recipient, such an implementation may lead to excessive email traffic in the manager's inbox, and so may not be desired.

Figure 3:
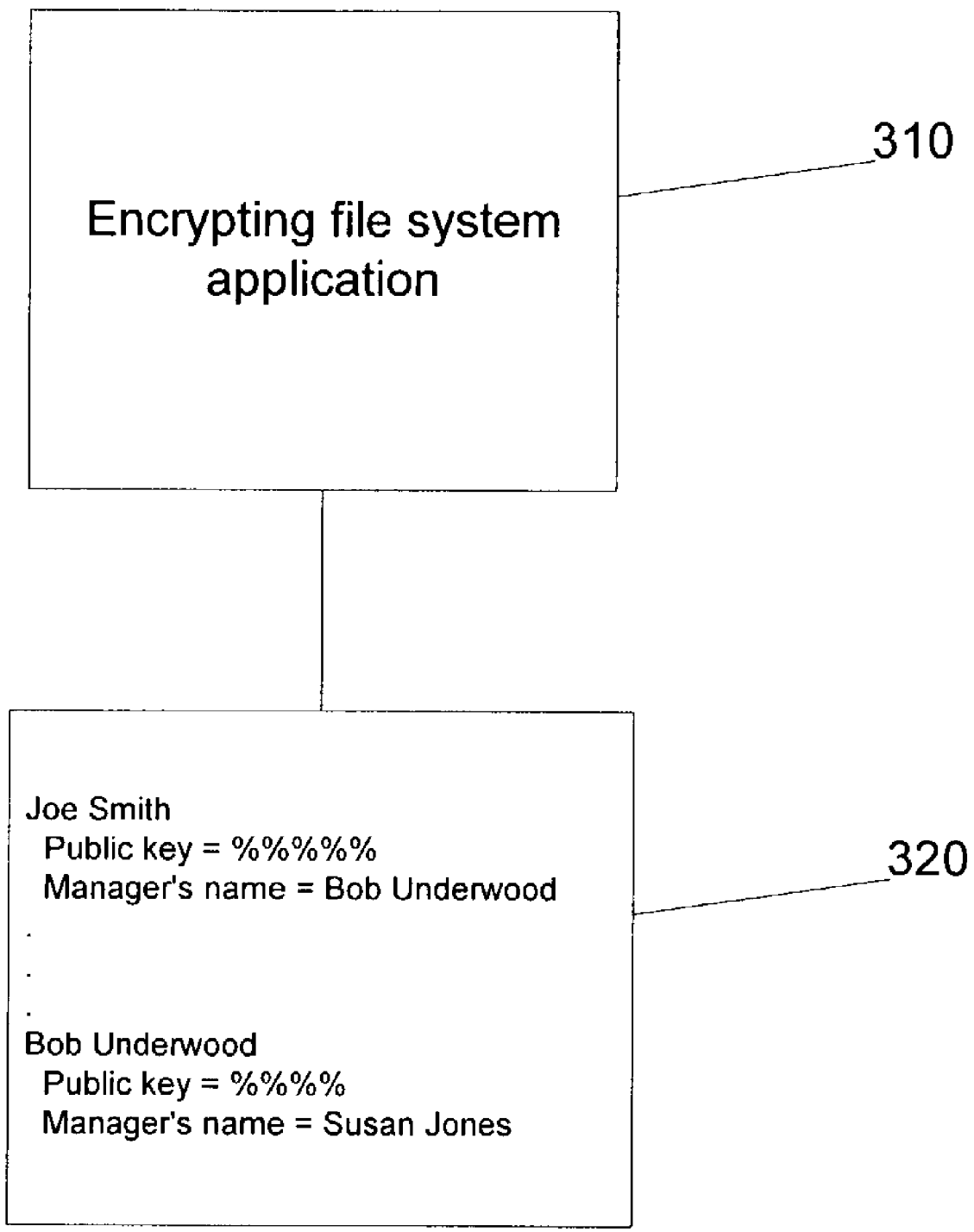
FIG. 3 shows how content recovery may be enabled in an encrypting file system application.

FIG. 3 shows an implementation using an encrypting file system (EFS). Encrypting file systems may be used so that if an unauthorized person has access to the file's storage medium (e.g., the file is stored on the hard drive of a notebook computer that is subsequently stolen), the data is not compromised.

A user creates a file to be stored as an encrypted file using an EFS 310. The user may specify one or more persons who are to have access to the file. EFS 310 may access a directory 320 to obtain the public key of those persons, as well as the name and public keys of their managers.

Systems and techniques as described above may provide the advantage that removable cryptographic devices such as SmartCards may be used. Since the private key never leaves the SmartCard, data may be more secure than in a system where the private key is extractable (e.g., as in the key escrow system described above).

Additionally, the above-described systems and techniques may be easy to implement. Existing applications such as encryption applications, email applications, and encrypting file system applications may be modified to obtain the information above from a directory. The process may thus be implemented by upgrading existing infrastructure rather than requiring the addition of new applications.

For example, the implementation of FIG. 2 may be incorporated into existing email systems, such as email systems using standards such as S/MIME. Similarly, the implementation of FIG. 3 may be incorporated into existing EFS systems such as Microsoft's Encrypting File System. The processes of FIGS. 1A and 1B may be incorporated into other applications as well.

Systems and techniques described above may also provide a desirable balance between ease of access to encrypted documents and security. By encrypting the data or session key so that a user's manager can decrypt the data, the problem of inaccessible keys may be largely mitigated. Additionally, since the user's manager is generally authorized to access the user's files or other data, there may be no additional exposure of the data. In contrast, both key escrow and master key systems generally allow at least some system administrators access to the private keys.

Figure 4:
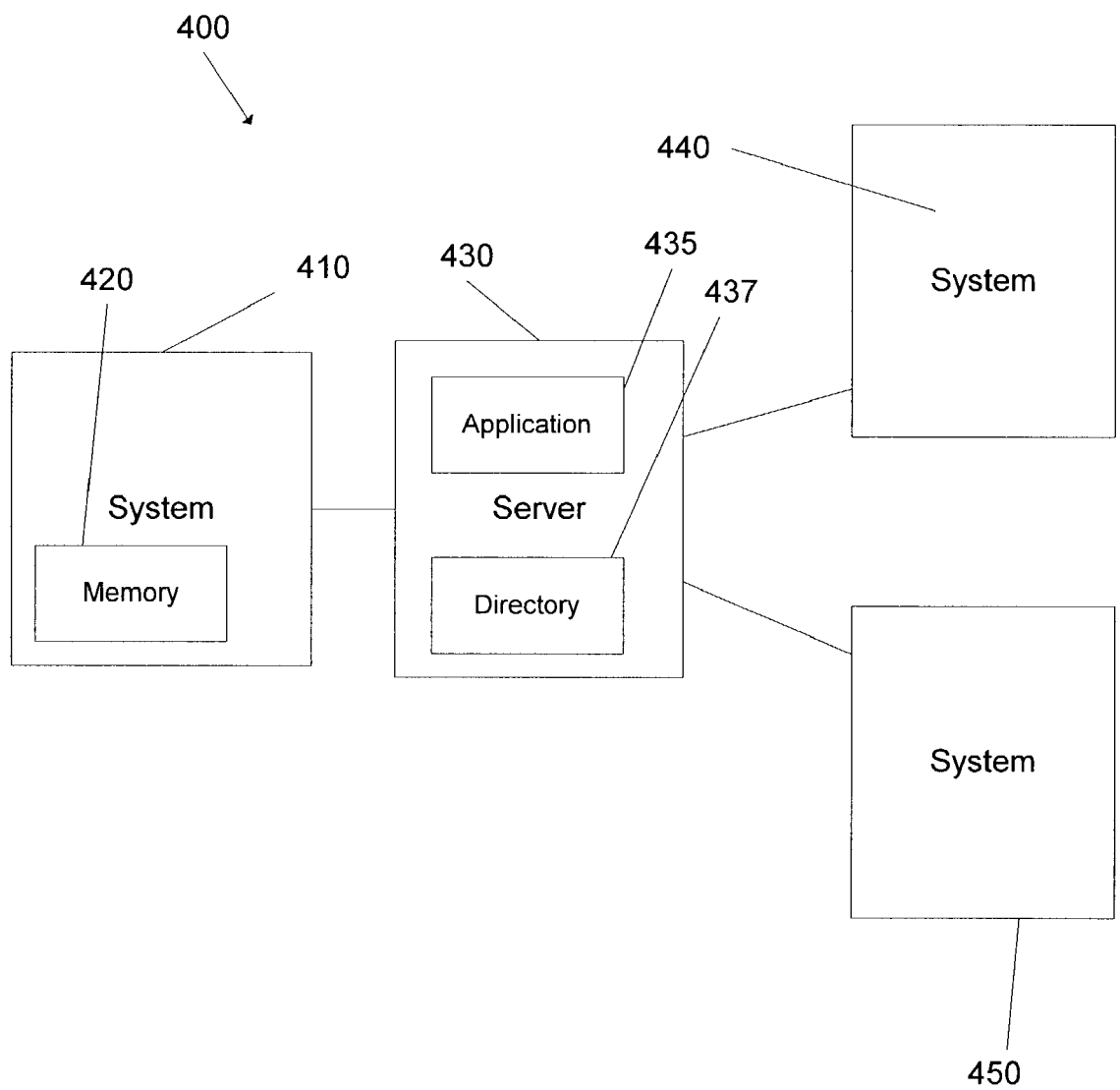
FIG. 4 shows a system that may be used to enable content recovery.

FIG. 4 shows a system 400 for enabling content recovery. A user data processing system 410, such as a personal computer, notebook computer, PDA, or other data processing system, may store a document in a memory 420. System 410 may access a server 430 to access one or more memories on server 430 storing an encryption application 435 and a directory 437. For example, application 435 may be an encrypting email system or encrypting file system.

For an example where application 435 is an encrypting email system, a user may access application 435 via system 410. The user may choose one or more recipients of an encrypted email (e.g., the text of the email and/or any email attachments may be encrypted). Application 435 may access directory 437 to obtain the public keys of the recipients, the name of at least one recipient's manager, and the public key of the manager(s).

Application 435 may generate a session key, encrypt the appropriate data using the session key, and encrypt the session key itself using both the recipients public key and the public key of the manager(s). Application 435 may then send the email to the recipients, including the multiple copies of the encrypted session key. Although application 435 "sends" the email, it may be stored on server 430, to be read by the recipient via a recipient data processing system 440.

Upon receiving the email, the recipient may decrypt the data using his private key. However, if he doesn't have access to his private key, he may decrypt the data using the private key of his manager. If his manager's key is stored on data processing system 450, he may decrypt the email from system 450. If his manager's private key is stored on a SmartCard, he may decrypt the email using the SmartCard at his own system 440 or his manager's system 450.

Application 435 may be an encrypting file system application. A user may access application 435 from system 410 to store encrypted data in memory 420. The user may choose one or more persons to have access to the encrypted data. A default may be that the user himself has access to the encrypted data.

Application 435 may access directory 437 for the user's (and/or other person to have access to the data) public key, the user's manager's name or other identifier, and the user's manager's public key. Application 435 may produce a session key, encrypt the data using the session key, and encrypt the session key using the user's and his manager's public keys.

System 400 shows an example system that may be used. In other implementations, application 435 and/or directory 437 may be stored on separate systems or be stored on the user's system 410. Many other configurations are possible.

A number of implementations have been described. Nevertheless, it will be understood that various modifications may be made without departing from the spirit and scope of the invention. The acts shown in the figures and/or recited in the claims may be performed in different orders than those shown/discussed. For example, in FIG. 1A, the directory may be queried prior to the creation of the session key and/or the encryption of data using the session key.

Additionally, the public key of persons other than the user's manager may be used to enable content recovery. For example, a directory entry for a first person may include his public key, and the name or identifier of a second person. Thus, the second person is associated with the first person by virtue of the directory entry. Note that the identifier of the second person may be a pointer to the directory entry of the second person or other similar object. Although using the manager's public key may enable efficient use of existing directory structures, some implementations may find it advantageous to use the key of a different person instead of (or in addition to) that of the user's manager. Accordingly, other implementations are within the scope of the following claims.

What is claimed is:

1. A method, comprising:
accessing a data structure to obtain a user public key, to determine a manager associated with the user, and to obtain a manager public key; and
encrypting data using the user public key and the manager public key.

2. The method of claim 1, further comprising accessing the data structure once to obtain the user public key, to determine the manager of the user, and to obtain the manager public key.

3. The method of claim 1, further comprising accessing the data structure more than once to obtain the user public key, to determine the manager of the user, and to obtain the manager public key.

4. The method of claim 1, further comprising generating a session key.

5. A method, comprising:
accessing a data structure to obtain a user public key, to determine a manager associated with the user, and to obtain a manager public key;
encrypting data using the user public key and the manager public key; and
generating a session key, wherein encrypting data using the user public key and the manager public key comprises encrypting the session key.

6. A method, comprising:
accessing a data structure to obtain a user public key, to determine a manager associated with the user, and to obtain a manager public key;
encrypting data using the user public key and the manager public key;
generating a session key; and
encrypting different data using the session key.

7. The method of claim 6, wherein the different data includes one or more electronic files.

8. The method of claim 7, wherein the one or more electronic files includes at least one of the group consisting of text of an email message and an attachment to an email message.

9. The method of claim 7, wherein the one or more electronic files include an electronic document to be stored using an encrypting file system.

10. The method of claim 1, wherein encrypting data using the user public key and the manager public key comprises encrypting one or more electronic files.

11. The method of claim 1, wherein the data structure is a directory.

12. A method, comprising:
determining a manager of an email recipient of a document;
retrieving a public key of the email recipient;
retrieving a public key associated with the manager;
creating a session key for the document;
encrypting the document using the session key;
encrypting the session key with the public key of the email recipient; and
encrypting the session key with the public key of the manager.

13. The method of claim 12, wherein the document includes email text.

14. The method of claim 12, wherein the document includes one or more email attachments.

15. A method comprising:
accessing a data object associated with a user to obtain a public key of a user;
accessing the data object associated with the user to determine a different user associated with the user;
accessing at least one of the data object associated with the user and a data object associated with the different user to obtain the public key of the different user; and
encrypting data using the public key of the user and the public key of the different user.

16. The method of claim 15, wherein the different user is the manager of the user.

17. The method of claim 15, wherein the data comprises a session key.

18. The method of claim 15, wherein the data comprises one or more electronic files.

19. The method of claim 15, wherein the data object associated with the user and the data object associated with the different user comprise entries in a directory.

20. A system, comprising:
means for storing public keys for a plurality of users;
means for accessing a public key of a user and a public key of a manager of the user; and
means for encrypting data using the public key of the user and the public key of the manager.

21. The system of claim 20, further comprising means for generating a session key, and wherein the means for encrypting data is to encrypt the session key.

22. The system of claim 20, further including means for storing encrypted data.

23. An apparatus, comprising:
a memory to store public keys for a plurality of users;
a data processing system to access the memory to obtain a public key associated with a user and to access the memory to obtain a public key associated with a manager of the user; and
an encryption device to encrypt data using the public key associated with the first user and to encrypt the data using the public key associated with the manager.

24. An apparatus, comprising:
a memory to store public keys for a plurality of users;
a data processing system to access the memory to obtain a public key associated with a user and to access the memory to obtain a public key associated with a manager of the user; and
an encryption device to encrypt data using the public key associated with the first user and to encrypt the data using the public key associated with the manager, wherein the data processing system is further to generate a session key, and wherein the encryption device is further to encrypt the session key.

25. The apparatus of claim 23, wherein the memory is further to store encrypted data.

26. An article comprising a machine-readable medium storing instructions operable to cause one or more machines to perform operations comprising:
accessing a data object associated with a user to obtain a public key of a user;
accessing the data object associated with the user to determine a different user associated with the user;
accessing at least one of the data object associated with the user and a data object associated with the different user to obtain the public key of the different user; and
encrypting data using the public key of the user and the public key of the different user.

27. The article of claim 26, wherein the another user is a manager of the user.

28. The article of claim 26, wherein the data comprises a session key.

29. An article comprising a machine-readable medium storing instructions operable to cause one or more machines to perform operations comprising:

accessing a data object associated with a user to obtain a public key of a user;

accessing the data object associated with the user to determine a different user associated with the user;

accessing at least one of the data object associated with the user and a data object associated with the different user to obtain the public key of the different user; and encrypting data using the public key of the user and the public key of the different user; and generating a session key and encrypting one or more electronic files using the session key.

* * * * *